US012656121B2

(12) United States Patent　(10) Patent No.:　US 12,656,121 B2
Godet et al.　(45) Date of Patent:　Jun. 16, 2026

(54) METHOD FOR LOCATING A USER EQUIPMENT WITH RESPECT TO A MOTOR VEHICLE

(71) Applicant: Continental Automotive Technologies GmbH, Hannover (DE)

(72) Inventors: Sylvain Godet, Saint Cezert (FR); Burak Sahinbas, Regensburg (DE)

(73) Assignee: Continental Automotive Technologies GmbH, Hannover (DE)

( * ) Notice: Subject to any disclaimer, the term of this patent is extended or adjusted under 35 U.S.C. 154(b) by 2 days.

(21) Appl. No.: 18/779,592

(22) Filed: Jul. 22, 2024

(65) Prior Publication Data

US 2025/0085107 A1　　Mar. 13, 2025

(30) Foreign Application Priority Data

Sep. 12, 2023　(FR) ...................................... 2309573

(51) Int. Cl.
　　*G01C 21/16*　　　(2006.01)
　　*G01S 13/02*　　　(2006.01)
　　*H04W 4/40*　　　(2018.01)

(52) U.S. Cl.
　　CPC ........ *G01C 21/165* (2013.01); *G01S 13/0209* (2013.01); *H04W 4/40* (2018.02)

(58) Field of Classification Search
　　CPC ..... G01C 21/165; H04W 4/40; G01S 13/0209
　　See application file for complete search history.

(56) References Cited

U.S. PATENT DOCUMENTS 9,154,920 B2 * 10/2015 O'Brien ................ H04W 4/027
11,400,889 B2 * 8/2022 Parthasarathi .......... G01S 11/04
(Continued)

FOREIGN PATENT DOCUMENTS

GB　　　2558589 A　　7/2018

OTHER PUBLICATIONS

Preliminary Search Report (Form 1503) and Written Opinion on the Patentability of the Invention (Form FR237) issued Mar. 13, 2024, by the French Patent Office in corresponding French Patent Application No. FR2309573 and an English machine translation thereof. (16 pages).

*Primary Examiner* — Hoi C Lau

(74) *Attorney, Agent, or Firm* — Buchanan Ingersoll & Rooney P.C.

(57)　　　ABSTRACT

A method for locating a user equipment with respect to a motor vehicle, including the following steps, carried out iteratively when the user is in motion: determining what is referred to as the "inter-object" distance between an ultra-wideband communication module of the vehicle and the user equipment; computing what is referred to as the "inter-step" distance covered by the user between two consecutive steps based on the measured acceleration and orientation values; and cross-referencing the determined inter-object distance and the computed inter-step distance in order to determine at least one probable location zone of the user equipment. The iterations ending when a single probable location zone of the user equipment with a surface area smaller than a predefined surface area has been determined. The single probable location zone then corresponding to the location of the user equipment around the vehicle.

11 Claims, 7 Drawing Sheets

(56) References Cited

U.S. PATENT DOCUMENTS

| | | | | |
|---|---|---|---|---|
| 11,710,358 B2 * | 7/2023 | Vaccariello | ........ | G07C 9/00309 |
| | | | | 340/5.61 |
| 11,770,703 B2 * | 9/2023 | De Vegt | ............. | H04L 63/1466 |
| | | | | 726/3 |
| 11,772,600 B2 * | 10/2023 | Hasegawa | ............. | B60R 25/245 |
| | | | | 701/2 |
| 11,914,064 B2 * | 2/2024 | Vaccariello | ........... | G01S 5/0244 |
| 12,097,843 B2 * | 9/2024 | Golgiri | ................ | G05D 1/2247 |
| 12,397,743 B2 * | 8/2025 | Elangovan | ............. | B60R 25/24 |
| 2014/0375420 A1 * | 12/2014 | Seiberts | ................. | B60R 25/20 |
| | | | | 340/5.31 |
| 2019/0051072 A1 * | 2/2019 | Okada | ...................... | H04W 4/40 |
| 2019/0090109 A1 * | 3/2019 | Moreira de Carvalho | .................. | |
| | | | | H04W 4/50 |
| 2021/0170991 A1 * | 6/2021 | Parthasarathi | .......... | H04W 4/48 |
| 2021/0179014 A1 * | 6/2021 | Hasegawa | ............. | H04B 17/27 |
| 2021/0179023 A1 * | 6/2021 | Hasegawa | ............. | B60L 53/31 |
| 2022/0229432 A1 * | 7/2022 | Van Wiemeersch | ..... | B62D 1/00 |
| 2022/0236363 A1 * | 7/2022 | Vaccariello | ........... | G01S 5/0284 |
| 2022/0237965 A1 * | 7/2022 | Vaccariello | .......... | H01Q 1/3241 |
| 2022/0322085 A1 * | 10/2022 | De Vegt | ............ | G07C 9/00309 |
| 2023/0159019 A1 * | 5/2023 | Golgiri | ................ | G05D 1/0016 |
| | | | | 701/2 |
| 2024/0300444 A1 * | 9/2024 | Elangovan | ............. | B60R 25/24 |
| 2024/0430746 A1 * | 12/2024 | Chong | ................ | H04W 28/084 |
| 2025/0085107 A1 * | 3/2025 | Godet | ..................... | G01S 5/018 |
| 2025/0244437 A1 * | 7/2025 | Palakonda | ............. | G01S 5/019 |

* cited by examiner

Time index: 6

Time index: 7

METHOD FOR LOCATING A USER EQUIPMENT WITH RESPECT TO A MOTOR VEHICLE

CROSS REFERENCE TO RELATED APPLICATIONS

This application claims priority to French Application No. 2309573, filed Sep. 12, 2023, the contents of such application being incorporated by reference herein.

FIELD OF THE INVENTION

The present invention pertains to the field of motor vehicles, and relates more particularly to a method for locating a user equipment with respect to a motor vehicle.

BACKGROUND OF THE INVENTION

Nowadays, vehicles comprise, as is known, an access system that makes it possible to activate welcome functions and functions for unlocking the opening elements of a vehicle. For example, one function may consist in activating vehicle welcome lighting when the user moves to within ten meters of the vehicle, or else in unlocking the opening elements when the user is located within two meters of the vehicle.

To this end, the vehicle comprises, as is known, communication modules, typically six to eight thereof, and an electronic control unit for controlling these modules. Each module comprises an antenna for sending and receiving signals to and from a device carried by the user, such as a key, a dedicated casing or a smartphone.

One technology widely used for communication between a key or a dedicated casing and the vehicle is based on radiofrequency (RF) and low-frequency (LF) signals. With this RF/LF technology, the user is able to be located around the vehicle by triangulation using signal strength. However, the use of a dedicated device (key or casing) is increasingly disappearing in favor of smartphones.

Indeed, the advent of smartphones and Bluetooth® and ultra-wideband (UWB) standards are leading OEMs and manufacturers to implement these communications between the vehicle and the user no longer via a key or a dedicated device, but directly via the user's smartphone. In particular, smartphones typically do not have an RF/LF interface, and communications via Bluetooth® or UWB are faster, and the signals are able to be exploited more easily. In addition, the use of signal strength to determine the location of a device carried by the user may be inaccurate, due to attenuation of the signals, in particular by the user's body.

To at least partially solve this problem, the UWB protocol makes it possible to determine the distance between each communication module and the smartphone using the time of flight of the signals and triangulation.

However, whatever the method used (signal strength or time of flight), locating the user around the vehicle requires the smartphone to be in communication with at least three communication modules at the same time in order to be able to locate it precisely through triangulation.

There are some solutions that attempt to at least partially rectify this drawback. For example, when only two communication modules are in communication with the smartphone (the others not being able to communicate with the smartphone because of an obstacle or the distance between them), one known solution consists in trying to determine a possible position and an impossible position of the smartphone. However, such determination is not always possible, and it is then not possible to determine the location of the smartphone with certainty. When a single communication module is in communication with the smartphone (the others not being able to communicate with the smartphone because of an obstacle or the distance between them), one known solution consists in using a satellite geolocation module, for example a GPS satellite geolocation module, in order to be able to approximately determine the location of the smartphone on a circle centered on said communication module. However, this solution cannot be implemented when the smartphone is in a zone that does not receive satellite geolocation signals, for example in a building or in mountainous areas that are out of coverage.

One obvious solution for attempting to at least partially rectify these drawbacks would be to increase the number of UWB communication modules from six or eight to ten or twelve or more, for example. However, this solution exhibits a number of drawbacks. First of all, each UWB communication module is particularly expensive, for example of the order of around one hundred euros, and the addition of multiple modules would entail a particularly high cost for the vehicle manufacturer, this generally being unacceptable in the motor vehicle industry. Next, each UWB communication module consumes a large amount of electrical energy, this again exhibiting a drawback that becomes increasingly significant as the number of UWB communication modules increases. Moreover, each UWB communication module requires wiring to connect it to the communication network of the vehicle and to the electronic control unit, but there is increasingly less space in vehicles for this wiring and the wiring may also cause problems during certification or even safety problems in the vehicle, in particular when it is installed in bumpers. Finally, since UWB communication modules communicate sequentially with the smartphone, the more of them there are, the more the time needed to communicate with all of the modules increases as well. However, this time is limited to 96 ms by the CCC standard, and the use for example of twelve UWB communication modules would lead to a time of the order of one and a half seconds, this being unacceptable.

A simple, reliable and effective solution for at least partially rectifying these drawbacks, in particular a solution that would make it possible to limit the number of UWB communication modules, would therefore be advantageous.

SUMMARY OF THE INVENTION

To this end, a first subject of the invention is a method for locating a user equipment with respect to a motor vehicle, said vehicle comprising an electronic control unit and a plurality of ultra-wideband communication modules, said user equipment, carried by a user, comprising an inertial measurement unit configured to provide acceleration and orientation data in relation to said user equipment and an ultra-wideband communication module configured to communicate with each of the ultra-wideband communication modules of the vehicle, said method comprising the following steps, carried out iteratively when the user is in motion:

exchanging ultra-wideband signals between at least one ultra-wideband communication module of the vehicle and the ultra-wideband communication module of the user equipment, determining what is referred to as the "inter-object" distance between said at least one ultra-wideband communication module of the vehicle and the user equipment based on the time of flight of the exchanged signals, measuring the acceleration and orientation values of the user equipment, computing what is referred to as the "inter-step" distance covered by the user between two consecutive steps based on the measured acceleration and orientation values, cross-referencing the determined inter-object distance and the computed inter-step distance in order to determine at least one probable location zone of the user equipment, the iterations ending when a single probable location zone of the user equipment with a surface area smaller than a predefined surface area has been determined, said single probable location zone then corresponding to the location of the user equipment around the vehicle.

The method according to an aspect of the invention makes it possible to accurately and quickly locate the user of the vehicle when they approach said vehicle. Indeed, a few steps of the user toward the vehicle are enough to determine, in the same number of iterations of the method, a series of probable location zones of the user equipment (and therefore of the user), which are narrowed down until a single zone with a surface area small enough to determine the exact location of the user equipment is obtained.

According to one aspect of the invention, the cross-referencing comprises determining probable positions of the user equipment at the inter-object distance and at the inter-step distance.

In one embodiment, the number of iterations is at least equal to four, for example equal to five or six.

An aspect of the invention also relates to a computer program product, characterized in that it comprises a set of program code instructions that, when they are executed by one or more processors, configure the one or more processors to implement a method as presented above.

An aspect of the invention also relates to a user equipment configured to implement the method as presented above, said user equipment furthermore being configured to send the location, determined following the iterations, to the vehicle.

An aspect of the invention also relates to an electronic control unit for a motor vehicle, said electronic control unit being configured to:

determine what is referred to as the "inter-object" distance between at least one ultra-wideband communication module of the vehicle and a user equipment carried by a user based on the time of flight of ultra-wideband signals exchanged between said at least one ultra-wideband communication module of the vehicle and an ultra-wideband communication module of said user equipment, receive acceleration and orientation values sent by the user equipment, compute what is referred to as the "inter-step" distance covered by the user between two consecutive steps based on the measured acceleration and orientation values, cross-reference the determined inter-object distance and the computed inter-step distance in order to determine at least one probable location zone of the user equipment, determine the location of the user equipment around the vehicle when a single probable location zone of the user equipment with a surface area smaller than a predefined surface area has been determined.

According to one aspect of the invention, the electronic control unit is configured, during the cross-referencing, to determine the probable positions of the user equipment at the inter-object distance and at the inter-step distance.

In one embodiment, the electronic control unit is configured to carry out at least four iterations of the method as presented above, preferably five or six iterations.

An aspect of the invention also relates to a motor vehicle comprising a plurality of ultra-wideband communication modules and an electronic control unit as presented above.

An aspect of the invention also relates to a communication system comprising a vehicle and a user equipment, said vehicle comprising an electronic control unit and a plurality of ultra-wideband communication modules, said user equipment comprising an inertial measurement unit configured to provide acceleration and orientation data in relation to said user equipment and an ultra-wideband communication module configured to communicate with each of the ultra-wideband communication modules of the vehicle, the vehicle and the user equipment being configured to implement the method as described above, the steps being distributed in any way between said vehicle and said user equipment, with the exception of the step of measuring the acceleration and orientation values of the user equipment, which is always carried out by the user equipment.

An aspect of the invention also relates to a communication system comprising a vehicle as presented above and a user equipment comprising an inertial measurement unit configured to provide acceleration and orientation data in relation to said user equipment and an ultra-wideband communication module configured to communicate with each of the ultra-wideband communication modules of the vehicle.

BRIEF DESCRIPTION OF THE DRAWINGS

Other features and advantages of aspects of the invention will become more apparent on reading the following description. This description is purely illustrative and should be read with reference to the attached drawings, in which.

DESCRIPTION OF THE EMBODIMENTS

Figure 1:
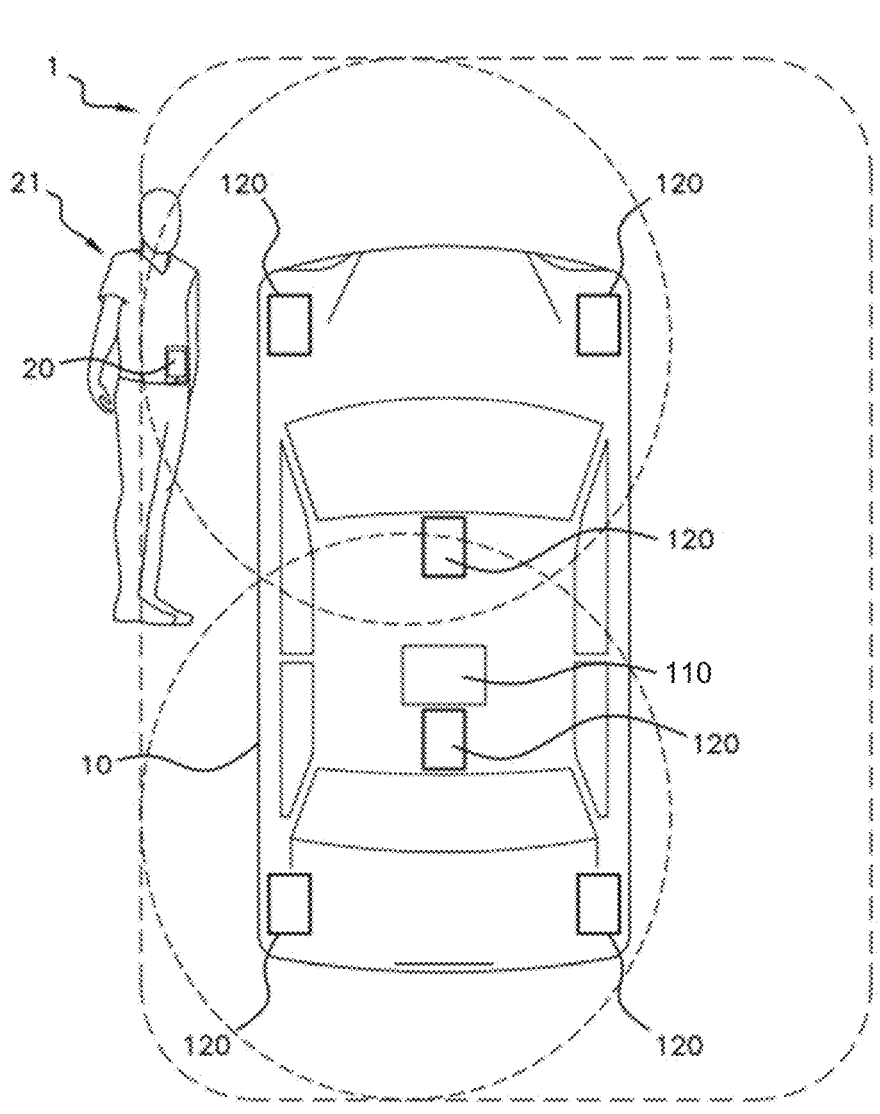
FIG. 1 schematically illustrates one embodiment of the system according to the invention.

FIG. 1 illustrates one example of a system 1 according to an aspect of the invention.

The system 1 comprises a vehicle 10 and a user equipment 20 carried by a user 21.

The vehicle 10 comprises an electronic control unit 110 and a plurality of ultra-wideband communication modules 120.

Figure 2:
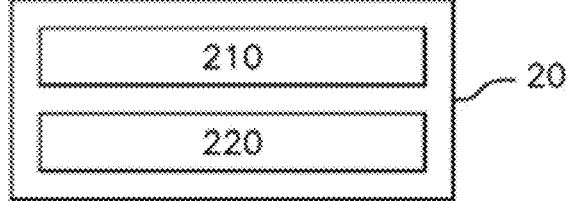
FIG. 2 schematically illustrates the user equipment of the system from FIG. 1.

With reference to FIG. 2, the user equipment 20 comprises an inertial measurement unit 210 configured to provide acceleration and orientation data in relation to said user equipment 20, and an ultra-wideband communication module 220 configured to communicate with each of the ultra-wideband communication modules 120 of the vehicle 10.

First Embodiment

In this first embodiment, the electronic control unit 110 is configured to determine what is referred to as the "inter-object" distance between at least one of the ultra-wideband communication modules 120 of the vehicle 10 and the user equipment 20 based on the time of flight of ultra-wideband signals exchanged between said at least one ultra-wideband communication module 120 of the vehicle 10 and the ultra-wideband communication module 220 of the user equipment 20.

In this first embodiment, the user equipment 20 is configured to send the measured acceleration and orientation values to the electronic control unit 110, and the electronic control unit 110 is configured to receive said acceleration and orientation values sent by the user equipment 10.

In this first embodiment, the electronic control unit 110 is configured to compute what is referred to as the "inter-step" distance covered by the user 21 between two consecutive steps based on the received acceleration and orientation values.

In this first embodiment, the electronic control unit 110 is configured to cross-reference the determined inter-object distance and the computed inter-step distance in order to determine at least one probable location zone of the user equipment 20. To this end, the electronic control unit 110 is configured, during the cross-referencing, to determine the probable positions of the user equipment 10 at the inter-object distance and at the inter-step distance.

The electronic control unit is configured to carry out multiple iterations of the above determinations and computations, the same number of times as the number of steps of the user 21, in order to be able to determine the location of said user 21, preferably at least four iterations, more preferably five or six iterations.

In this first embodiment, the electronic control unit 110 is configured to determine the location of the user equipment 20 around the vehicle 10 when a single probable location zone of the user equipment 10 with a surface area smaller than a predefined surface area is determined.

The electronic control unit 110 comprises a processor able to implement a set of instructions for carrying out these functions.

Second Embodiment

In a second embodiment, the user equipment 20 is configured to exchange ultra-wideband signals with at least one of the ultra-wideband communication modules 120 of the vehicle 10 via the ultra-wideband communication module 220.

In this second embodiment, the user equipment 20 is configured to receive what is referred to as the "inter-object" distance between said at least one ultra-wideband communication module 120 of the vehicle 10 and the user equipment 20 as computed by the electronic control unit 110 based on the time of flight of the exchanged signals.

In this second embodiment, the user equipment 20 is configured to measure acceleration and orientation values of the user equipment when the user 21 moves with the user equipment 20.

In this second embodiment, the user equipment 20 is configured to compute what is referred to as the "inter-step" distance covered by the user 21 between two consecutive steps based on the measured acceleration and orientation values.

In this second embodiment, the user equipment 20 is configured to cross-reference the determined inter-object distance and the computed inter-step distance in order to determine at least one probable location zone of the user equipment 20.

In this second embodiment, the user equipment 20 is configured to carry out the iterations of the above determinations and computations, the same number of times as the number of steps of the user 21, in order to be able to determine the location of said user 21, preferably at least four iterations, more preferably five or six iterations.

The iterations end when a single probable location zone of the user equipment with a surface area smaller than a predefined surface area has been determined by the user equipment 20, said single probable location zone then corresponding to the location of the user equipment 20 around the vehicle 10.

In this second embodiment, the user equipment 20 is configured to send the location, determined following the iterations, to the vehicle 10.

Exemplary Implementations

First Exemplary Implementation

Figure 3:
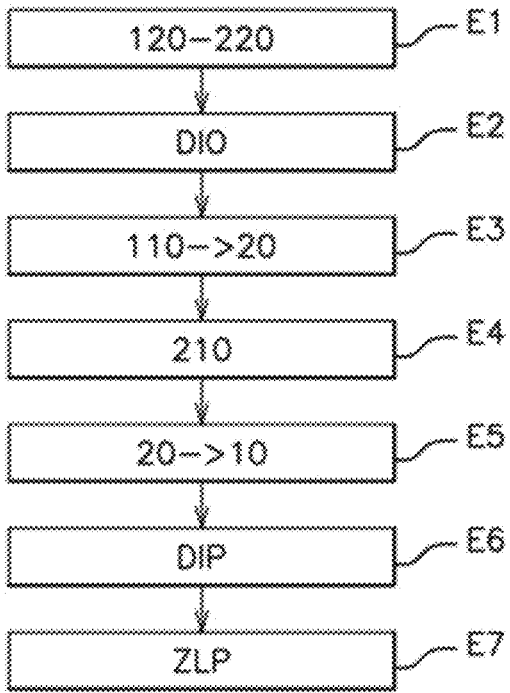
FIG. 3 schematically illustrates a first embodiment of the method according to the invention.

This first example implements the first embodiment and is described with reference to FIG. 3.

In this example, the user approaches a corner of the vehicle 10 such that they are able to see, that is to say such that they are able to communicate with, only one of the ultra-wideband communication modules 120 of the vehicle 10. The method begins with a first iteration when the user equipment 20 is detected by the ultra-wideband communication module 120 of the vehicle 10 that is within visibility.

The ultra-wideband communication module 220 of the user equipment 20 therefore first exchanges ultra-wideband signals with said single ultra-wideband communication module 120 of the vehicle 10 that it has within visibility in a step E1.

The electronic control unit 110 then determines, in a step E2, for example periodically, the inter-object distance DIO between the ultra-wideband communication module 120 of the vehicle 10 that is within visibility and the user equipment 20 based on the time of flight of the exchanged signals, and then sends the determined inter-object distance to the user equipment 20 via the ultra-wideband communication module 120 of the vehicle 10 that is within visibility in a step E3.

The inertial measurement unit 210 of the user equipment 20 measures, in a step E4, the acceleration and orientation values of the user equipment 20 when the user 21 is moving, and then sends, in a step E5, the measured values to the electronic control unit 110 via the ultra-wideband communication module 120 of the vehicle 10 that is within visibility.

The electronic control unit 110 then computes, in a step E6, the inter-step distance DIP covered by the user 21 between two consecutive steps based on the received acceleration and orientation values, and then cross-references, in a step E7, the determined inter-object distance DIO and the computed inter-step distance DIP in order to determine at least one probable location zone ZLP of the user equipment 20.

Steps E1 to E7 are reiterated until the electronic control unit 110 determines a single probable location zone ZLP with a surface area smaller than a predefined surface area and that corresponds to the location of the user equipment 20 around the vehicle 10.

Second Exemplary Implementation

Figure 4:
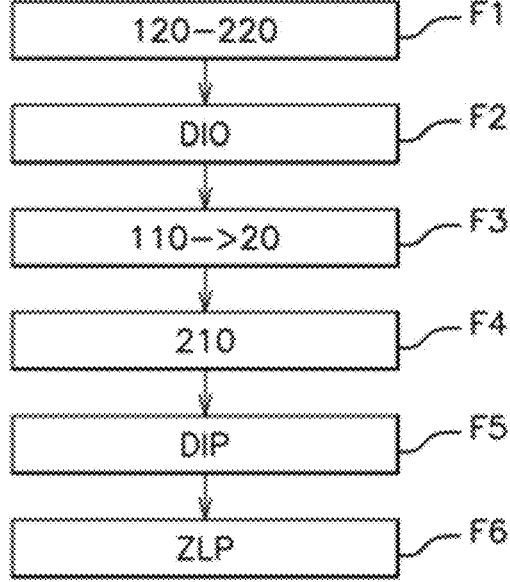
FIG. 4 schematically illustrates a second embodiment of the method according to the invention.
Figure 5:
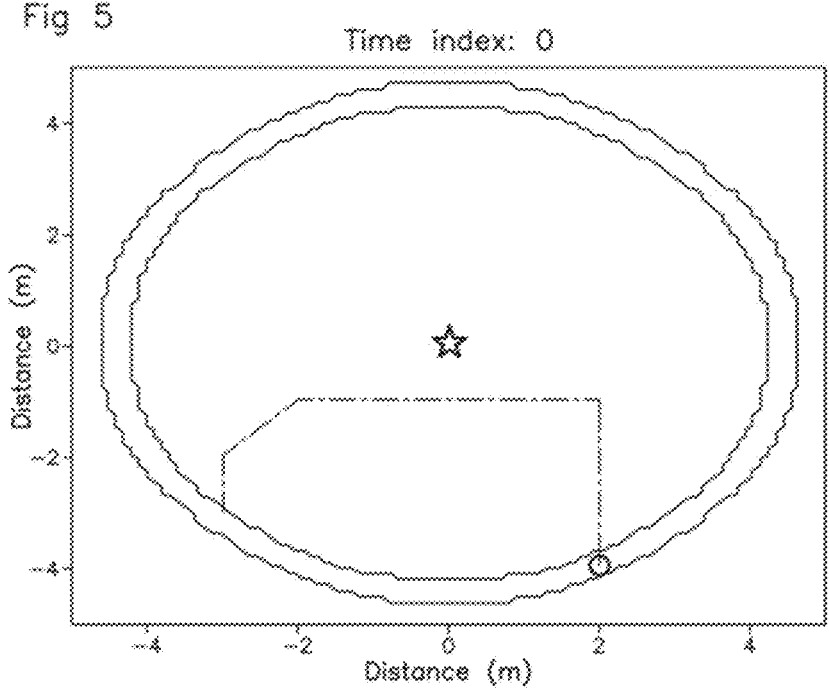
FIG. 5 illustrates one exemplary implementation of the method according to an aspect of the invention in a first iteration.
Figure 6:
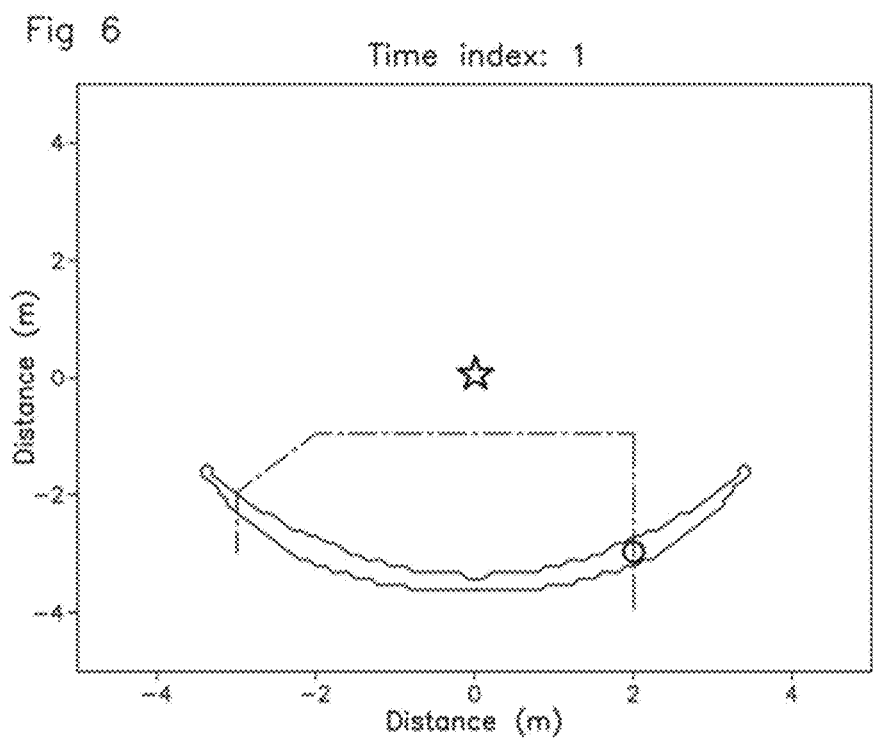
FIG. 6 illustrates one exemplary implementation of the method according to an aspect of the invention in a second iteration.
Figure 7:
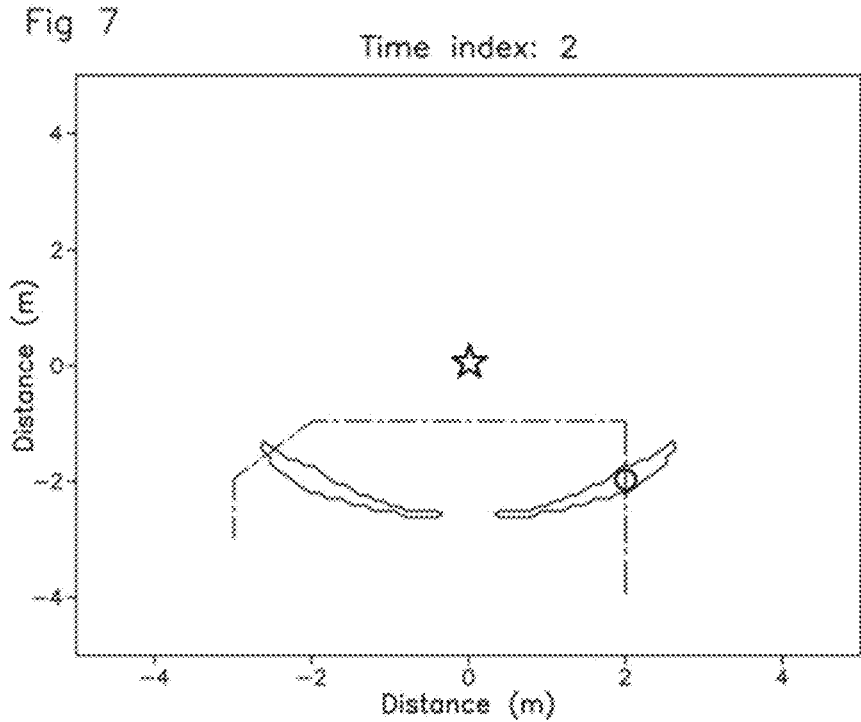
FIG. 7 illustrates one exemplary implementation of the method according to an aspect of the invention in a third iteration.
Figure 8:
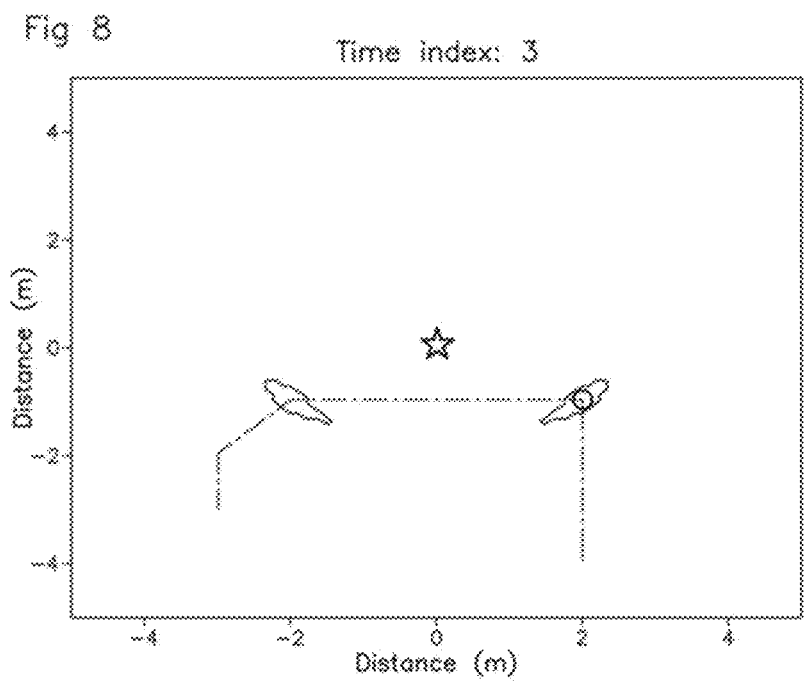
FIG. 8 illustrates one exemplary implementation of the method according to an aspect of the invention in a fourth iteration.
Figure 9:
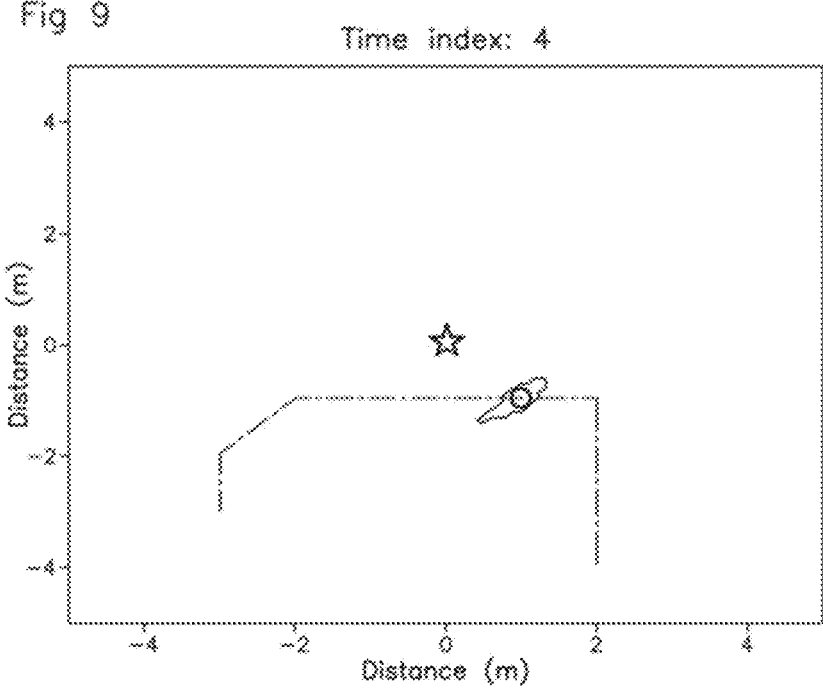
FIG. 9 illustrates one exemplary implementation of the method according to an aspect of the invention in a fifth iteration.
Figure 10:
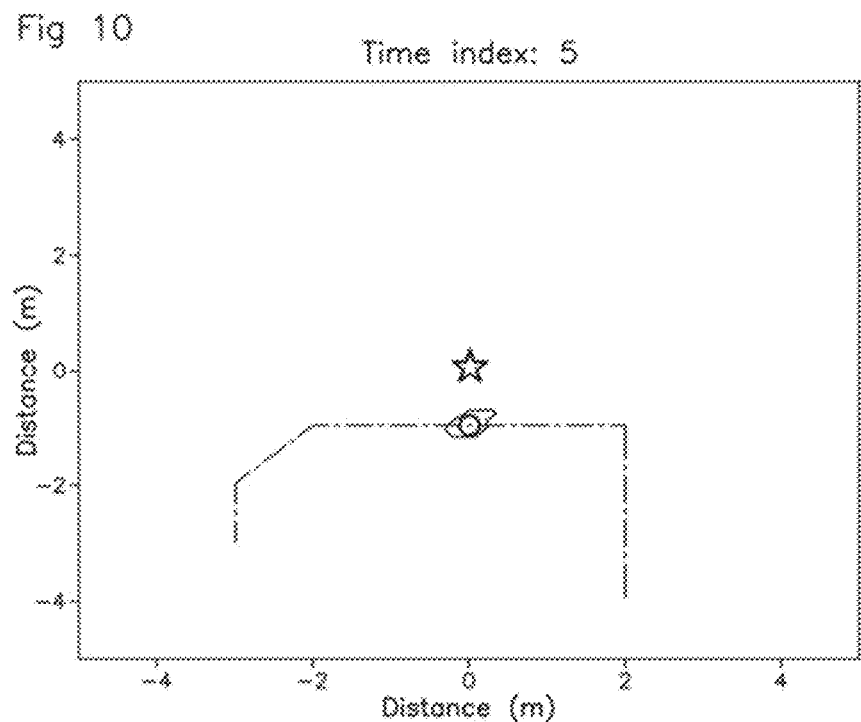
FIG. 10 illustrates one exemplary implementation of the method according to an aspect of the invention in a sixth iteration.
Figure 11:
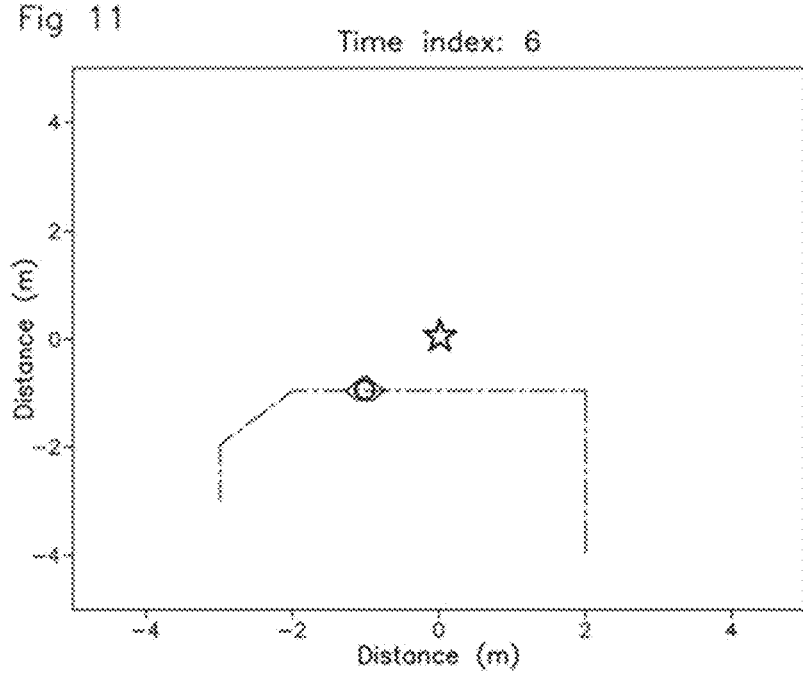
FIG. 11 illustrates one exemplary implementation of the method according to the invention in a seventh iteration.
Figure 12:
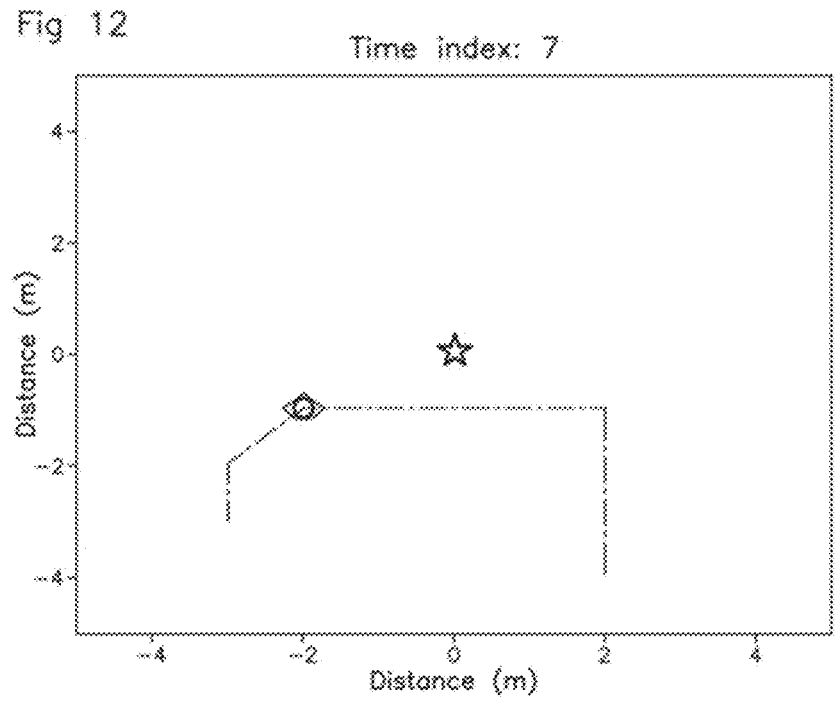
FIG. 12 illustrates one exemplary implementation of the method according to an aspect of the invention in an eighth iteration.
Figure 13:
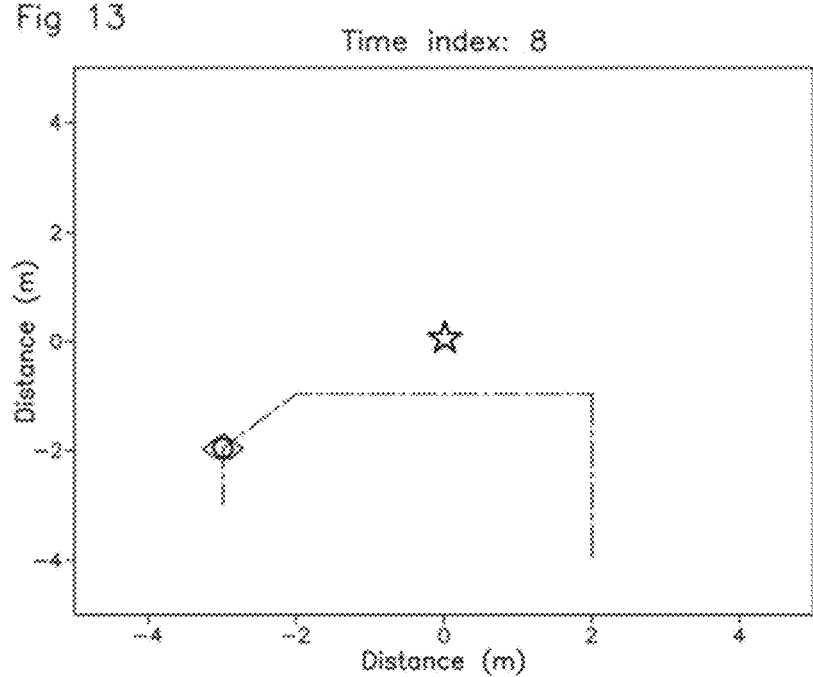
FIG. 13 illustrates one exemplary implementation of the method according to an aspect of the invention in a ninth iteration.
Figure 14:
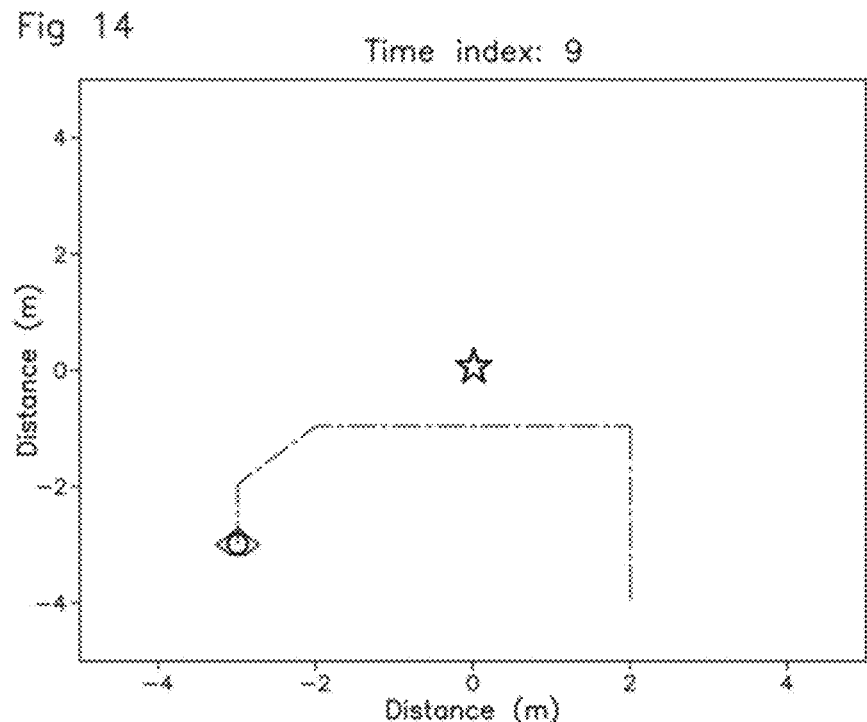
FIG. 14 illustrates one exemplary implementation of the method according to an aspect of the invention in a tenth iteration.

This second example implements the second embodiment and is described with reference to FIG. 4.

In this example, as in the previous example, the user approaches a corner of the vehicle 10 such that they are able to see, that is to say such that they are able to communicate with, only one of the ultra-wideband communication modules 120 of the vehicle 10. The method begins with a first iteration when the user equipment 20 is detected by the ultra-wideband communication module 120 of the vehicle 10 that is within visibility.

The ultra-wideband communication module 220 of the user equipment 20 therefore first exchanges ultra-wideband signals with said single ultra-wideband communication module 120 of the vehicle 10 that it has within visibility in a step F1.

The electronic control unit 110 then determines, in a step F2, for example periodically, the inter-object distance DIO between the ultra-wideband communication module 120 of the vehicle 10 that is within visibility and the user equipment 20 based on the time of flight of the exchanged signals, and then sends the determined inter-object distance DIO to the user equipment 20 via the ultra-wideband communication module 120 of the vehicle 10 that is within visibility in a step F3. As a variant, the user equipment 20 may determine the inter-object distance in step F2, for example periodically, and there is no sending step F3.

Next, the inertial measurement unit 210 of the user equipment 20 measures, in a step F4, the acceleration and orientation values of the user equipment 20 when the user 21 is moving.

The user equipment 20 then computes, in a step F5, the inter-step distance DIP covered by the user 21 between two consecutive steps based on the received acceleration and orientation values, and then cross-references, in a step F6, the determined inter-object distance DIO and the computed inter-step distance DIP in order to determine at least one probable location zone ZLP of the user equipment 20.

Steps F1 to F6 are reiterated until the user equipment 20 determines a single probable location zone ZLP with a surface area smaller than a predefined surface area and that corresponds to the location of said user equipment 20 around the vehicle 10.

It should be noted that the steps of the method according to an aspect of the invention, with the exception of measuring acceleration and orientation values of the user equipment 20, may be implemented by either the electronic control unit 110 or the user equipment 20. The other embodiments whose steps are implemented in part by the electronic control unit 110 and in part by the user equipment 20 and which differ from the two examples given above are thus also covered by an aspect of the present invention.

Example of a Simulation

FIGS. 5 to 14 are a depiction, in the form of a two-dimensional geographical map seen from above, of one example of determining the position of the user equipment 20 in the first ten iterations of the method according to an aspect of the invention. The dimensions of the map are in meters.

The ultra-wideband communication module 120 of the vehicle 10 is represented by a white star. The user equipment 20 is represented by a disk. The trajectory of the user equipment is represented by the lines followed by the disk. The probable location zones ZLP are shown in light gray. The background of the map (zones other than the probable location zones ZLP) are shown in black.

In the first iteration (FIG. 5), it is established that the user equipment 20 is located at a given distance from the ultra-wideband communication module 120. Its probable location zone ZLP is therefore in the form of a circle whose thickness represents the measurement tolerance (uncertainty regarding the measured distance).

In the second iteration (FIG. 6), the user 21 having taken a step and therefore with knowledge of their step length and the orientation of the user equipment 20 (direction of movement), the method makes it possible to reduce the probable location zone ZLP to a distinct area that corresponds to an arc of the circle.

The third iteration (FIG. 7) makes it possible, after an additional step taken by the user 21, to reduce the probable location zone ZLP to two distinct areas that correspond to two arc portions of the circle, having a total surface area smaller than the surface area of the probable location zone ZLP determined in the previous iteration.

The fourth iteration (FIG. 8) makes it possible, after an additional step taken by the user 21, to further reduce the probable location zone ZLP, again to two distinct areas in this example, that correspond to two arc portions of the circle, having a total surface area smaller than the surface area of the probable location zone ZLP determined in the previous iteration.

The fifth iteration (FIG. 9) makes it possible, after an additional step taken by the user 21 and a change of direction on their part, to reduce the probable location zone ZLP to a single probable location zone ZLP here having a surface area substantially equal to that of one of the areas obtained in the previous iteration and smaller than the predefined surface area that corresponds to the location of said user equipment 20 around the vehicle 10.

The sixth, seventh, eighth, ninth and tenth iterations (FIGS. 10 to 14) make it possible, after an additional step taken by the user 21 in each iteration, to further refine the surface area of the probable location zone ZLP in order to improve the accuracy of the location of the user equipment 20 along its trajectory.

An aspect of the invention therefore makes it possible to quickly, reliably and effectively determine the position of the user equipment 20 with respect to the vehicle 10, that is to say its location around the vehicle 10, by using both the trajectory followed by the user equipment 20 and the distance between the vehicle 10 and the user equipment 20.

The invention claimed is:

1. A method for locating a user equipment with respect to a motor vehicle, said vehicle comprising an electronic control unit and a plurality of ultra-wideband communication modules, said user equipment, carried by a user, comprising an inertial measurement unit configured to provide acceleration and orientation data in relation to said user equipment and an ultra-wideband communication module configured to communicate with each of the ultra-wideband communication modules of the vehicle, said method comprising the following steps, carried out iteratively when the user is in motion:

exchanging ultra-wideband signals between at least one ultra-wideband communication module of the vehicle and the ultra-wideband communication module of the user equipment, determining what is referred to as the "inter-object" distance between said at least one ultra-wideband communication module of the vehicle and the user equipment based on the time of flight of the exchanged signals, measuring the acceleration and orientation values of the user equipment, computing what is referred to as the "inter-step" distance covered by the user between two consecutive steps of the user based on the measured acceleration and orientation values, cross-referencing the determined inter-object distance and the computed inter-step distance in order to determine at least one probable location zone of the user equipment, the iterations ending when a single probable location zone of the user equipment with a surface area smaller than a predefined surface area has been determined, said single probable location zone then corresponding to the location of the user equipment around the vehicle.

2. The method as claimed in claim 1, wherein the cross-referencing comprises determining probable positions of the user equipment at the inter-object distance and at the inter-step distance.

3. The method as claimed in claim 1, wherein the number of iterations is at least equal to four, for example equal to five or six.

4. A non-transitory computer program product, wherein it comprises further comprising a set of program code instructions that, when they are executed by one or more processors, configure the one or more processors to implement a method as claimed in claim 1.

5. A user equipment configured to implement the method as claimed in claim 1, said user equipment furthermore being configured to send the location, determined following the iterations, to the vehicle.

6. An electronic control unit for a motor vehicle, said electronic control unit being configured to:

determine what is referred to as the "inter-object" distance between at least one ultra-wideband communication module of the vehicle and a user equipment carried by a user based on the time of flight of ultra-wideband signals exchanged between said at least one ultra-wideband communication module of the vehicle and an ultra-wideband communication module of said user equipment, receive acceleration and orientation values sent by the user equipment, compute what is referred to as the "inter-step" distance covered by the user between two consecutive steps of the user based on the measured acceleration and orientation values, cross-reference the determined inter-object distance and the computed inter-step distance in order to determine at least one probable location zone of the user equipment, determine the location of the user equipment around the vehicle when a single probable location zone with a surface area smaller than a predefined surface area has been determined.

7. The electronic control unit as claimed in claim 6, said electronic control unit being configured, during the cross-referencing, to determine the probable positions of the user equipment at the inter-object distance and at the inter-step distance.

8. An electronic control unit for a motor vehicle, said electronic control unit being configured to:

determine what is referred to as the "inter-object" distance between at least one ultra-wideband communication module of the vehicle and a user equipment carried by a user based on the time of flight of ultra-wideband signals exchanged between said at least one ultra-wideband communication module of the vehicle and an ultra-wideband communication module of said user equipment, receive acceleration and orientation values sent by the user equipment, compute what is referred to as the "inter-step" distance covered by the user between two consecutive steps of the user based on the received acceleration and orientation values, cross-reference the determined inter-object distance and the computed inter-step distance in order to determine at least one probable location zone of the user equipment, determine the location of the user equipment around the vehicle when a single probable location zone with a surface area smaller than a predefined surface area has been determined, said electronic control unit being configured, during the cross-referencing, to determine the probable positions of the user equipment at the inter-object distance and at the inter-step distance, and said electronic control unit being configured to carry out the method as claimed in claim 1 at least four times.

9. A motor vehicle comprising a plurality of ultra-wideband communication modules and an electronic control unit as claimed in claim 6.

10. A communication system comprising a vehicle as claimed in claim 9 and a user equipment comprising an inertial measurement unit configured to provide acceleration and orientation data in relation to said user equipment, and an ultra-wideband communication module configured to communicate with each of the ultra-wideband communication modules of the vehicle.

11. The electronic control unit as claimed in claim 8, wherein the carrying out of the method of claim 1 at least four times is carrying out of the method five times or carrying out of the method six times.

* * * * *